(12) United States Patent
Suzuki et al.

(10) Patent No.: US 9,383,699 B2
(45) Date of Patent: Jul. 5, 2016

(54) METHOD FOR PRODUCING A FIXING PRESSURE ROLLER

(71) Applicant: SYNZTEC CO., LTD., Tokyo (JP)

(72) Inventors: Masaya Suzuki, Kanagawa (JP); Akira Nishida, Kanagawa (JP); Shingo Sugiyama, Kanagawa (JP)

(73) Assignee: SYNZTEC CO., LTD., Tokyo (JP)

( * ) Notice: Subject to any disclaimer, the term of this patent is extended or adjusted under 35 U.S.C. 154(b) by 0 days.

(21) Appl. No.: 14/953,035

(22) Filed: Nov. 27, 2015

(65) Prior Publication Data

US 2016/0085192 A1 Mar. 24, 2016

Related U.S. Application Data

(62) Division of application No. 14/333,832, filed on Jul. 17, 2014.

(30) Foreign Application Priority Data

Jul. 17, 2013 (JP) .................................. 2013-148938
Jun. 19, 2014 (JP) .................................. 2014-126629

(51) Int. Cl.
| | | |
|---|---|---|
| *G03G 15/20* | (2006.01) | |
| *B29C 35/02* | (2006.01) | |
| *B29K 105/04* | (2006.01) | |
| *B29K 83/00* | (2006.01) | |
| *B29L 31/00* | (2006.01) | |

(52) U.S. Cl.
CPC ........ *G03G 15/2089* (2013.01); *B29C 35/0233* (2013.01); *G03G 15/206* (2013.01); *B29K 2083/005* (2013.01); *B29K 2105/045* (2013.01); *B29L 2031/767* (2013.01)

(58) Field of Classification Search
CPC ............. G03G 15/206; G03G 15/2089; B29C 35/0233
USPC .................................. 399/331, 333; 264/29.7
See application file for complete search history.

(56) References Cited

U.S. PATENT DOCUMENTS

| | | | | |
|---|---|---|---|---|
| 4,616,917 A | * | 10/1986 | Sakurai | ................ G03G 15/206 219/216 |
| 4,681,718 A | | 7/1987 | Oldham | |
| 6,546,223 B2 | | 4/2003 | Kishino | |
| 2004/0132597 A1 | | 7/2004 | Sakakibara et al. | |
| 2008/0273904 A1 | | 11/2008 | Nishida et al. | |
| 2009/0047048 A1 | * | 2/2009 | Ikeda | ................. G03G 15/2057 399/333 |
| 2010/0012712 A1 | | 1/2010 | Swoboda et al. | |

FOREIGN PATENT DOCUMENTS

JP 3969942 6/2007

* cited by examiner

*Primary Examiner* — Benjamin Schmitt
(74) *Attorney, Agent, or Firm* — Young & Thompson (57) ABSTRACT

The present invention provides a fixing pressure roller exhibiting excellent compression set and having low hardness and low heat capacity, as well as a fixing device including the fixing pressure roller. A pressure roller employed in a fixing unit of a fixing device includes a core, and an elastic layer provided around the core, wherein the elastic layer is formed of a silicone rubber product produced by mixing a silicone rubber raw material with resin microballoons and water, and then curing the silicone rubber raw material; and the silicone rubber product includes therein voids provided by breakage of the resin microballoons through application of pressure, and voids provided through evaporation of the water.

4 Claims, 9 Drawing Sheets

Filling with water          Application of water pressure

Filling with water

FIG. 2B

Application of water pressure

FIG. 2C

Return to atmospheric pressure and removal of water

FIG. 2D

Heating

FIG. 2E

Completion of silicone rubber product having cells whose size corresponds to the original size of resin microballoons

METHOD FOR PRODUCING A FIXING PRESSURE ROLLER

The entire disclosure of Japanese Patent Applications No. 2013-148938 filed on Jul. 17, 2013 and No. 2014-126629 filed on Jun. 19, 2014 is expressly incorporated by reference herein.

BACKGROUND OF THE INVENTION

1. Field of the Invention

The present invention relates to a pressure-applying fixing roller (hereinafter referred to as a "fixing pressure roller"), and to a fixing device including the fixing pressure roller, which fixing device is suitable for use in an image-forming apparatus.

2. Background Art

A fixing device is employed in an image-forming apparatus such as a copying machine, a facsimile machine, or a laser beam printer. In the fixing mechanism of a fixing device, a heated fixing member (e.g., a heated fixing roller) is rotated in association with rotation of a pressure roller facing the fixing member. In the fixing mechanism, a large nip must be provided between the pressure roller and the fixing member for fixing a toner image on a fed paper sheet by means of pressure and heat. A large fixing width can be achieved by forming the pressure roller from silicone rubber having low hardness. Therefore, the pressure roller is generally formed from silicone rubber foam which has low hardness and low heat capacity (i.e., suppresses loss of heat from a heat source).

There has been proposed a technique for further lowering the hardness of such silicone rubber foam. In the technique, resin microballoons and a volatile component are incorporated into silicone rubber, and, during curing of the silicone rubber, pores are provided between cells through breakage of the resin microballoons or vaporization of the volatile component (see, for example, Patent Document 1). However, this technique (i.e., provision of pores between cells through vaporization of the volatile component) poses problems in that pores are not uniformly distributed, and sufficiently low hardness fails to be achieved.

When a paper sheet is not fed to such a fixing device, operation of the pressure roller is stopped while it is pressed against the fixing member. Therefore, in the case where the pressure roller is formed of a rubber layer of large thickness, a portion of the roller pressed against the fixing member may be deformed, which may cause a problem that defective fixing occurs after resumption of operation of the fixing device. Thus, silicone rubber employed for forming the pressure roller is required not only to have low hardness and low heat capacity, but also to exhibit excellent compression set.

Patent Document 1: Japanese Patent No. 3969942

SUMMARY OF THE INVENTION

In view of the foregoing, an object of the present invention is to provide a fixing pressure roller exhibiting excellent compression set and having low hardness and low heat capacity. Another object of the present invention is to provide a fixing device including the fixing pressure roller.

In a first mode of the present invention for attaining the aforementioned objects, there is provided a fixing pressure roller employed in a fixing unit of a fixing device, the fixing pressure roller comprising a core, and an elastic layer provided around the core, wherein the elastic layer is formed of a silicone rubber product produced by mixing a silicone rubber raw material with resin microballoons and water, and then curing the silicone rubber raw material; and the silicone rubber product includes therein voids provided by breakage of the resin microballoons through application of pressure, and voids provided through evaporation of the water.

The present invention realizes provision of a fixing pressure roller exhibiting excellent compression set and having low hardness and low heat capacity.

The pressure is preferably water pressure.

In this case, the resin microballoons can be reliably broken, and the hardness of the fixing pressure roller can be further reduced.

The elastic layer preferably has thereon a release layer.

In this case, the fixing pressure roller exhibits excellent fixing performance and high reliability.

In a second mode of the present invention, there is provided a fixing device comprising the fixing pressure roller as recited in the first mode.

Since the fixing device of the present invention comprises the fixing pressure roller exhibiting excellent compression set and having low hardness and low heat capacity, the fixing device exhibits excellent durability and high reliability.

The present invention realizes a fixing pressure roller exhibiting excellent compression set and having low hardness and low heat capacity, as well as a fixing device including the fixing pressure roller.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

The present invention will next be described in detail with reference to embodiments.

Embodiment 1

The fixing pressure roller of the present invention is employed for fixing an unfixed toner imager onto a recording medium by means of heat and pressure in a fixing unit of an image-forming apparatus. As described hereinbelow, the fixing pressure roller may be applied to, for example, a pressure roller or a fixing roller. In Embodiment 1, the fixing pressure roller is employed as a pressure roller.

Figure 1A:
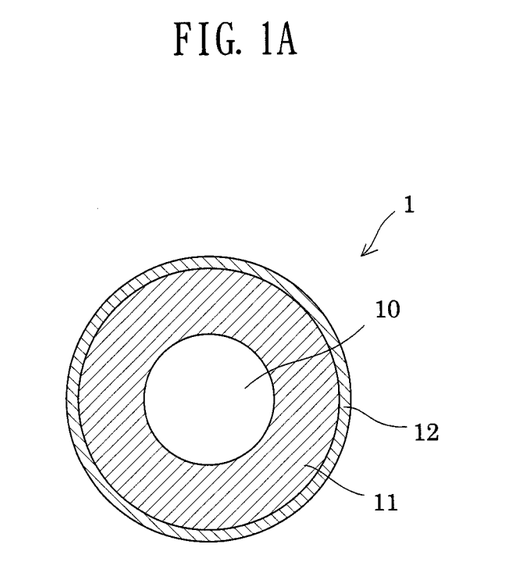
FIG. 1A is a transverse cross-sectional view of a pressure roller according to Embodiment 1.
Figure 1B:
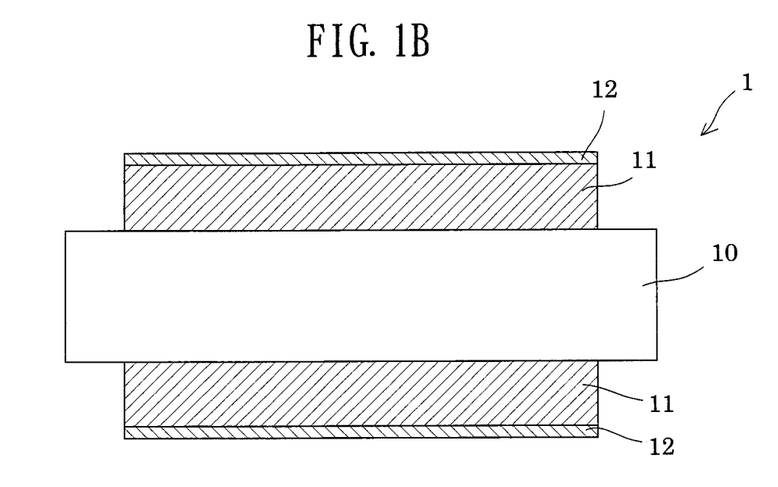
FIG. 1B is a longitudinal cross-sectional view of the same pressure roller.

FIG. 1A is a transverse cross-sectional view of a pressure roller according to Embodiment 1, and FIG. 1B is a longitudinal cross-sectional view of the same pressure roller. The pressure roller 1 includes a core 10, an elastic layer 11 provided around the core 10, and a release layer 12 provided on the elastic layer 11.

In the present invention, the elastic layer 11 is formed of a silicone rubber product produced by mixing a silicone rubber raw material with resin microballoons and water, and then curing the silicone rubber raw material. The silicone rubber product includes therein voids provided by breakage of the resin microballoons through application of pressure, and voids provided through evaporation of the water. Specifically, the elastic layer 11 is formed by producing a silicone rubber product through heating (primary curing) of a silicone rubber raw material mixed with resin microballoons and water, and applying pressure to the silicone rubber product to thereby break the resin microballoons contained therein, followed by heating (secondary curing) of the silicone rubber product.

As used herein, the expression "application of pressure" refers to a process of applying pressure to the silicone rubber product for breaking the resin microballoons contained therein. As used herein, the term "breakage" generally refers to the case the resin microballoons are broken, but also refers to the case where the state of the resin microballoons differs from that before curing of the silicone rubber raw material; for example, the case where the resin microballoons crack or shrink through application of pressure. In the present invention, most of the resin microballoons can be broken through application of pressure.

When the resin microballoons are broken, voids are provided at positions where the resin microballoons have been present. That is, voids provided through breakage of the resin microballoons correspond to spaces provided by breakage of the resin microballoons through application of pressure to the silicone rubber product, at which the resin microballoons have been present before application of pressure.

Water is evaporated through heating (primary curing and secondary curing) of the silicone rubber product at a temperature equal to or higher than the evaporation temperature of water, whereby voids are provided at positions where water has been present. That is, voids provided through evaporation of water correspond to spaces (cells) provided through evaporation thereof.

In the present invention, since the silicone rubber raw material is mixed with water, the resin microballoons are readily removed from the silicone rubber product, and breakage of the resin microballoons through application of pressure is further promoted. That is, water exhibits the effect of reducing adhesion between the resin microballoons and the silicone rubber product. In addition, the water becomes overheated water vapor through secondary curing of the silicone rubber product, and promotes carbonization of the broken resin microballoons. Through this carbonization of the resin microballoons, adjacent voids communicate with one another. Furthermore, since water is uniformly distributed throughout the silicone rubber product under application of pressure, carbonization of the resin microballoons and communication of voids uniformly occur throughout the elastic layer. Therefore, cells communicate with one another throughout the elastic layer 11, whereby the hardness and heat capacity of the elastic layer 11 are reduced. Thus, the pressure roller 1 including the elastic layer 11 exhibits excellent compression set.

The core 10 forming the pressure roller 1 is formed of a metal or a resin material. No particular limitation is imposed on the metal or resin material employed, so long as it can form the core of the pressure roller 1. Also, no particular limitation is imposed on the shape of the core 10, and the core 10 may optionally be hollow.

No particular limitation is imposed on the silicone rubber forming the elastic layer 11, so long as the silicone rubber forms an elastic product through curing under heating. Specific examples of the silicone rubber include liquid silicone rubber and millable silicone rubber. Preferably, liquid silicone rubber is employed. The silicone rubber employed may be commercially available one. Needless to say, two or more species of silicone rubber may be employed in combination.

Each of the resin microballoons is formed of a thermoplastic polymer shell encapsulating a liquefied gas or a gas. When pressure is applied to the silicone rubber product after primary curing of the silicone rubber raw material, the thermoplastic polymer shells of the resin microballoons employed in Embodiment 1 are broken, to thereby provide voids.

No particular limitation is imposed on the intensity of applied pressure, so long as the resin microballoons can be broken. The pressure intensity may be appropriately determined in consideration of, for example, the type of the resin microballoons. Specifically, the pressure is preferably 5 MPa to 30 MPa, more preferably 10 MPa to 25 MPa. The pressure application method may be, for example, application of liquid pressure (e.g., water or oil pressure), or application of gas pressure (e.g., air, helium, nitrogen, carbon dioxide, hydrogen, or oxygen pressure). Of these, liquid pressure is preferred, and water pressure is particularly preferred. In Embodiment 1, the resin microballoons are broken through application of water pressure.

The mean size of unexpanded resin microballoons falls within a range of about 6 μm to about 45 μm, and the mean size of expanded resin microballoons falls within a range of about 20 μm to about 130 μm. The size of voids provided through breakage of expanded resin microballoons is preferably equal to the mean size of the expanded resin microballoons before breakage thereof. For example, when expanded resin microballoons having a mean size of 40 μm to 60 μm are employed, the size of voids provided through breakage of the microballoons is preferably 20 μm to 80 μm, more preferably 30 μm to 70 μm.

When unexpanded resin microballoons are employed, the size of voids provided through breakage of the microballoons is generally several times to several tens of times the mean size of the microballoons before breakage thereof. For example, when unexpanded resin microballoons having a mean size of 10 μm to 16 μm are employed, the size of voids provided through breakage of the microballoons is preferably 20 µm to 200 µm, more preferably 50 µm to 100 µm.

In Embodiment 1, the "mean size of resin microballoons" corresponds to the median (D50) thereof as measured by means of a laser diffraction/scattering particle size distribution meter. "Size distribution" refers to the range of sizes of voids corresponding to resin microballoons as determined by use of an electron micrograph thereof. The aforementioned resin microballoons employed may be expanded or unexpanded resin microballoons. The resin microballoons employed may be commercially available ones, and two or more species thereof may be employed in combination. When liquid silicone rubber is employed as the silicone rubber raw material, expanded resin microballoons are preferably employed, whereas when millable silicone rubber is employed, unexpanded resin microballoons, which are less likely to break during kneading, are preferably employed.

The amount of the resin microballoons incorporated may be appropriately determined in consideration of the amount of the water incorporated. Generally, the amount of the resin microballoons is preferably 1 to 10 parts by mass, more preferably 1 to 3 parts by mass, on the basis of 100 parts by mass of the silicone rubber. When the amount of the resin microballoons falls within the above range, the microballoons can be uniformly and reliably distributed in the elastic layer 11. When the amount of the resin microballoons is excessively small, sufficient durability may fail to be achieved, whereas when the amount of the resin microballoons is excessively large, the viscosity of the silicone rubber raw material increases, which may result in failure of molding.

No particular limitation is imposed on the water incorporated into the silicone rubber raw material, and the water may be, for example, purified water, distilled water, ion-exchanged water, or tap water. No particular limitation is imposed on the temperature of the water during mixing thereof. The amount of the water incorporated may be appropriately determined in consideration of the amount of the resin microballoons incorporated. Generally, the amount of the water is preferably 5 to 100 parts by mass on the basis of 100 parts by mass of the silicone rubber. When the amount of the water falls within the above range, breakage of the resin microballoons through application of pressure is promoted. When the amount of the water is excessively small, breakage of the resin microballoons through application of pressure, or carbonization of the broken resin microballoons may fail to be promoted, whereas when the amount of the water is excessively large, the resultant silicone rubber product may become brittle.

The thickness of the elastic layer 11 is adjusted to, for example, 0.5 mm to 20 mm, preferably 2 mm to 6 mm. Adjustment of the thickness to fall within this range is for the purpose of improving toner fixing property, and attaining a high-quality image.

The release layer 12 is preferably formed of a synthetic resin material having high releasability; for example, a fluororesin. Examples of the fluororesin include perfluoroalkoxy resin (PFA), polytetrafluoroethylene (PTFE), tetrafluoroethylene-hexafluoropropylene copolymer (FEP), and tetrafluoroethylene-ethylene copolymer (ETFE). Particularly, perfluoroalkoxy resin (PFA) is preferably employed. No particular limitation is imposed on the thickness of the release layer 12, so long as high releasability can be imparted to the fixing pressure roller. The thickness of the release layer 12 is, for example, 1 µm to 100 µm, preferably 30 µm to 70 µm. The release layer 12 may be omitted. When the release layer 12 is omitted, the fixing pressure roller is employed as, for example, a fixing roller 30A of a fixing belt 20 shown below in Embodiment 3 (see FIG. 5).

According to the present invention, most of the resin microballoons can be broken through application of pressure. Breakage of the resin microballoons is further promoted by virtue of the presence of the water contained in the silicone rubber product. In addition, the water becomes overheated water vapor through secondary curing of the silicone rubber product, and promotes carbonization of the broken resin microballoons, whereby adjacent voids communicate with one another. Therefore, cells communicate with one another throughout the elastic layer 11, and the hardness and heat capacity of the elastic layer 11 are reduced. Thus, the pressure roller 1 exhibits excellent compression set.

Next will be described a method for producing the pressure roller of Embodiment 1.

The production method for the pressure roller 1 of Embodiment 1 will be described by taking, as an example, the case where liquid silicone rubber is employed as a silicone rubber raw material. Firstly, resin microballoons and water are mixed with and dispersed in liquid silicone rubber, to thereby prepare a silicone rubber composition.

Subsequently, a core 10 is placed into a mold, and the silicone rubber composition is charged around the core 10, followed by heating (primary curing) of the silicone rubber composition. Specifically, heating is carried out at a temperature which is equal to or higher than the curing temperature of the liquid silicone rubber, and which is equal to or lower than the softening temperature of resin microballoon shells (i.e., thermoplastic polymer), to thereby cure the silicone rubber composition without breaking the resin microballoons. Thus, a silicone rubber product is produced.

Next, the silicone rubber product is placed into a pressure container, and water pressure is applied to the silicone rubber product, to thereby break most of the resin microballoons.

Figure 2A:
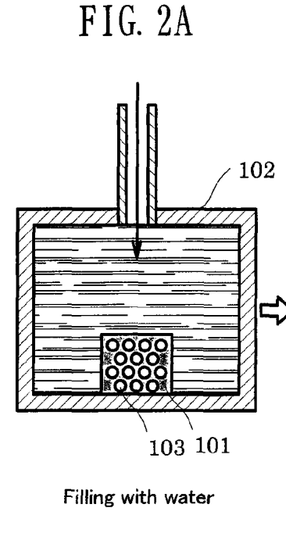
FIGS. 2A to 2E are schematic sketches showing a step of breaking resin microballoons by means of water pressure.
Figures 2B, 2C:
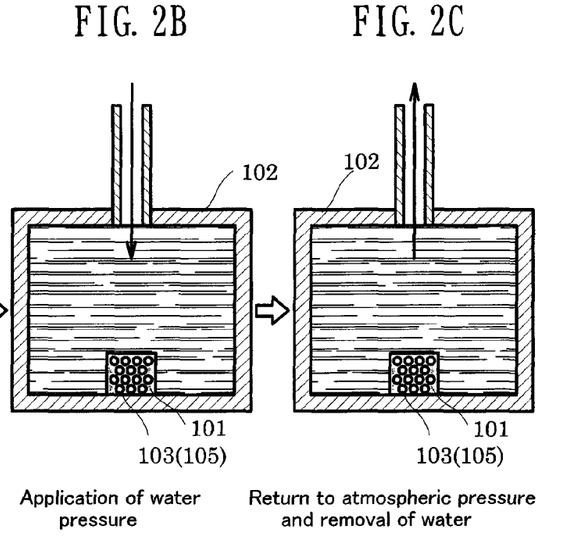
Figure 2D:
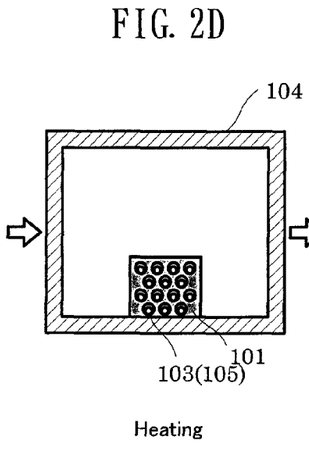
Figure 2E:
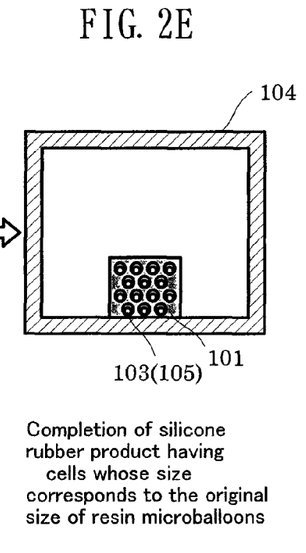

Now will be described a step of breaking resin microballoons by means of water pressure. FIGS. 2A to 2E are schematic sketches showing a step of breaking resin microballoons. Firstly, a silicone rubber product 101 produced through primary curing is placed into a pressure container 102, and the pressure container 102 is filled with water (FIG. 2A). Subsequently, water pressure is applied to the interior of the pressure container 102. Through this water pressure treatment, the silicone rubber product 101 is compressed, and most of resin microballoons 103 are broken, to thereby provide voids (FIG. 2B). Next, the pressure container 102 is returned to atmospheric pressure, and the water is removed therefrom (FIG. 2C). Then, the silicone rubber product 101 is removed from the pressure container 102 and heated in a thermostatic chamber 104 so that the compressed silicone rubber product 101 is returned to its original state (FIG. 2D). When the silicone rubber product 101 is returned to its original state, voids 105 provided through breakage of the resin microballoons 103 are expanded, and voids 105 having a size larger than that of voids shown in FIG. 2B are provided at positions where the resin microballoons 103 have been present before application of water pressure (FIG. 2E). Thus, most of the resin microballoons 103 contained in the silicone rubber product 101 are broken, to thereby provide the voids 105. Thereafter, the silicone rubber product 101 is further heated (secondary curing).

Subsequently, a release layer 12 is formed on the elastic layer 11. The release layer 12 may be formed of a PFA tube, or may be formed through, for example, application of a coating liquid. Water pressure treatment and secondary curing may be carried out after formation of the release layer 12 on the silicone rubber product produced through primary curing.

Water pressure treatment is preferably carried out on the silicone rubber product produced through primary curing. However, water pressure treatment may be carried out in parallel with curing (primary curing) of the silicone rubber composition, or may be carried out after secondary curing.

The timing or state of breakage of the resin microballoons can be controlled by appropriately regulating the conditions for water pressure application or the number of pressure application cycles. Thus, no particular limitation is imposed on the pressure application method or the number of pressure application cycles.

Figure 3:
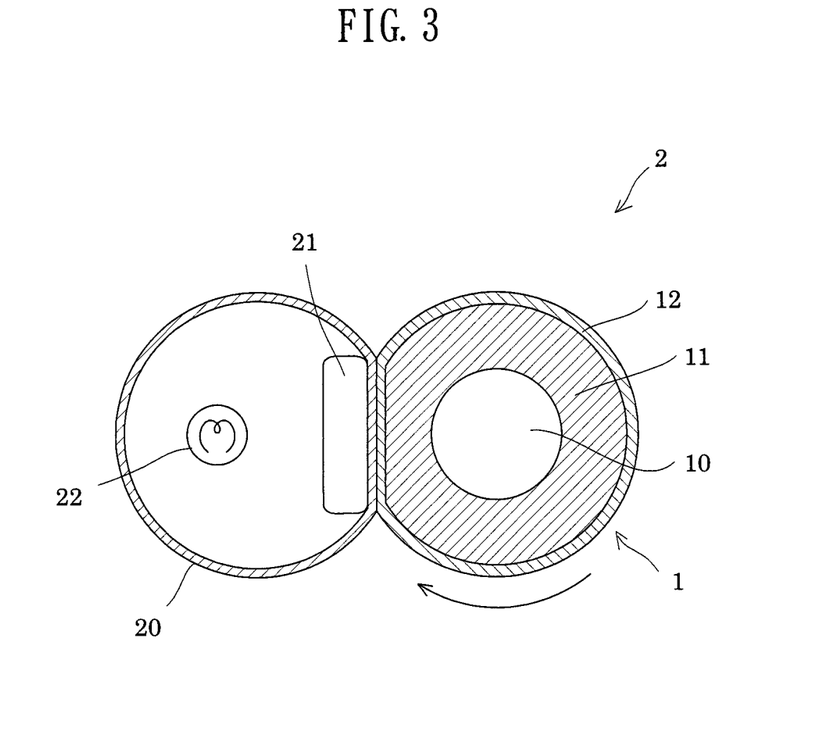
FIG. 3 is a cross-sectional view of a fixing device according to Embodiment 1, the fixing device including the pressure roller.

Next will be described a fixing device. FIG. 3 is a cross-sectional view of a fixing device according to Embodiment 1. As shown in FIG. 3, the fixing device 2 includes the pressure roller 1; a fixing belt 20 provided so as to face the pressure roller 1; a pressure member 21 which is located so as to face the pressure roller 1 and which applies pressure from the inside of the fixing belt 20 to the pressure roller 1, to thereby form a specific nip; and heating means 22 for heating the fixing belt 20 to a specific temperature.

No particular limitation is imposed on the fixing belt 20, so long as it can form a specific nip when it comes into pressure contact with the facing pressure roller 1. For example, the fixing belt 20 includes a metal substrate having at least one seamless electroformed belt; a sliding layer formed on the inner peripheral surface of the metal substrate; an elastic layer formed on the outer peripheral surface of the metal substrate; and a release layer formed on the outer peripheral surface of the elastic layer.

The pressure member 21 is formed of, for example, an elastic material (e.g., rubber), a resin, or a metal. The surface of the pressure member 21 may optionally be provided with a layer formed of a fluororesin or the like, or provided with, for example, a sliding sheet or a groove. The surface of the sliding sheet may be subjected to an embossing process.

No particular limitation is imposed on the heating means 22, so long as it can heat the fixing belt 20. The heating means 22 may be provided on the outside of the fixing belt 20. The heating means 22 may be, for example, a halogen heater, a heating wire heater, an infrared heater, or electromagnetic induction heating by means of an exciting coil (heat source). The heating means 22 may be provided inside of the pressure member 21.

The fixing device 2 according to Embodiment 1 includes the pressure roller 1 exhibiting excellent compression set and having low hardness and low heat capacity. Therefore, the fixing device exhibits excellent durability and high reliability.

Embodiment 2

In Embodiment 2, the fixing pressure roller is employed as a fixing roller or a pressure roller. Components common between the fixing device of Embodiment 2 and that of Embodiment 1 are denoted by the same reference numerals, and repeated description thereof is omitted.

Figure 4:
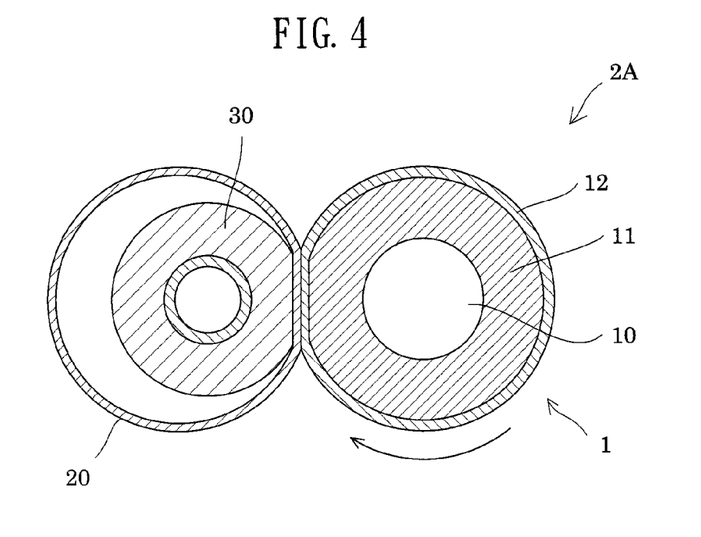
FIG. 4 is a cross-sectional view of a fixing device according to Embodiment 2, the fixing device including a fixing roller and a pressure roller.

FIG. 4 is a cross-sectional view of the fixing device according to Embodiment 2, the fixing device including a fixing roller and a pressure roller. As shown in FIG. 4, the fixing device 2A includes the pressure roller 1; a fixing belt 20 provided so as to face the pressure roller 1; and a fixing roller 30 which is provided instead of a pressure member, and which applies pressure from the inside of the fixing belt 20 to the pressure roller 1. Non-illustrated heating means is provided outside of the fixing roller 30. The fixing pressure roller of Embodiment 2 may be employed as the fixing roller 30 shown in FIG. 4 or as the pressure roller 1.

Embodiment 3

In Embodiment 3, the fixing pressure roller is employed as a fixing roller or a pressure roller. Components common between the fixing device of Embodiment 3 and that of Embodiment 1 are denoted by the same reference numerals, and repeated description thereof is omitted.

Figure 5:
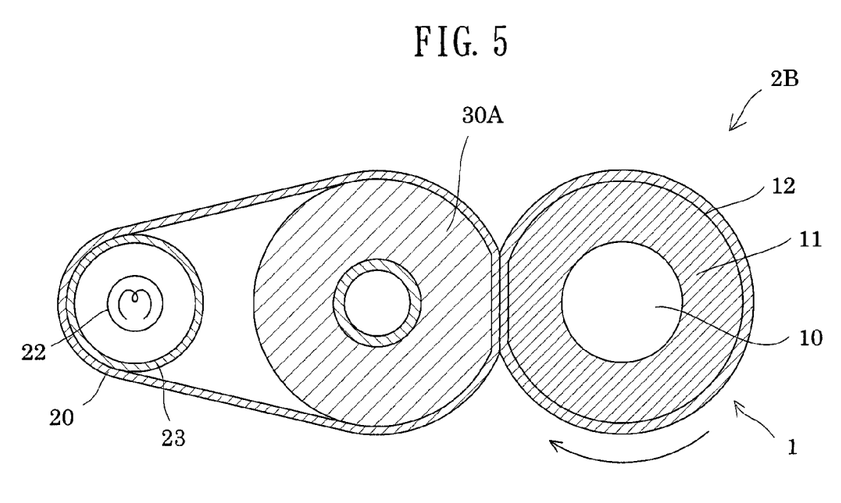
FIG. 5 is a cross-sectional view of a fixing device according to Embodiment 3, the fixing device including a fixing roller and a pressure roller.

FIG. 5 is a cross-sectional view of the fixing device according to Embodiment 3, the fixing device including a fixing roller and a pressure roller. As shown in FIG. 5, the fixing device 2B includes the pressure roller 1; a fixing belt 20 provided so as to face the pressure roller 1; a fixing roller 30A which applies pressure from the inside of the fixing belt 20 to the pressure roller 1; and a heating roller 23 including therein heating means 22. The fixing roller 30A and the heating roller 23 are provided inside of the fixing belt 20, and the fixing belt 20 is rotated by means of the fixing roller 30A and the heating roller 23. The fixing pressure roller of Embodiment 3 may be employed as the fixing roller 30A shown in FIG. 5 or as the pressure roller 1.

Embodiment 4

In Embodiment 4, the fixing pressure roller is employed as a fixing roller or a pressure roller. Components common between the fixing device of Embodiment 4 and that of Embodiment 1 are denoted by the same reference numerals, and repeated description thereof is omitted.

Figure 6:
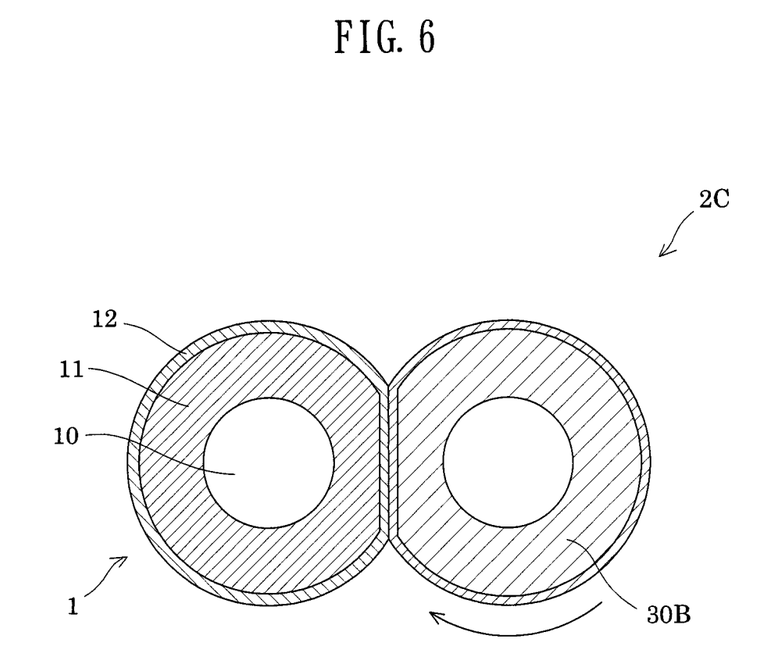
FIG. 6 is a cross-sectional view of a fixing device according to Embodiment 4, the fixing device including a fixing roller and a pressure roller.

FIG. 6 is a cross-sectional view of the fixing device according to Embodiment 4, the fixing device including a fixing roller and a pressure roller. As shown in FIG. 6, the fixing device 2C includes the pressure roller 1, and a fixing roller 30B provided so as to face the pressure roller 1. The fixing roller 30B includes therein non-illustrated heating means. The fixing pressure roller of Embodiment 4 may be employed as the fixing roller 30B shown in FIG. 6 or as the pressure roller 1.

EXAMPLES

The present invention will next be described by way of examples, which should not be construed as limiting the invention thereto.

Example 1

A pressure roller 1 was produced through the following procedure. Specifically, liquid silicone rubber (DY35-796, product of Dow Corning Toray Co., Ltd.) (100 parts by mass) was mixed with resin microballoons (F-65DE, product of Matsumoto Yushi-Seiyaku Co., Ltd., expanded microballoons, mean size: 40 to 60 µm) (2 parts by mass) and purified water (30 parts by mass), and the resultant mixture was stirred by means of a Hobart mixer (three minutes×twice) for defoaming, to thereby prepare a silicone rubber composition.

Subsequently, a primer for liquid silicone rubber (XP81-405, product of Momentive) was applied to an iron-made core (diameter: 18 mm), and the primer was dried. The primer-applied core was placed on a lower flange, and a mold and an upper flange were placed on and fixed to the lower flange. Next, the above-prepared silicone rubber composition was poured into the mold through the lower flange by means of a pouring machine, and the composition was heated in a thermostatic chamber at 90° C. for 1.5 hours, to thereby produce a silicone rubber product (primary curing). Then, the silicone rubber product was cooled and removed from the mold. The silicone rubber product removed from the mold was placed into a pressure container, the pressure container was filled with water, and the silicone rubber product was compressed at a water pressure of 20 MPa for 10 minutes. Thereafter, the water was removed from the pressure container, and the container was returned to atmospheric pressure. Subsequently, the silicone rubber product was further heated in a thermostatic chamber at 230° C. for eight hours (secondary curing). Thereafter, the surface of the silicone rubber product was polished for shaping, and an adhesive (KE-1880, product of Shin-Etsu Chemical Co., Ltd.) was applied to the silicone rubber product through press coating. The silicone rubber product was covered with a PFA tube expanded by means of a mold, and the tube-covered product was heated at 150° C. for 30 minutes and at 200° C. for four hours, followed by cutting for sizing, to thereby produce a pressure roller 1 (outer diameter: 030 mm) including a core 10, a silicone rubber elastic layer 11, and a release layer 12 formed of the PFA tube.

In parallel with production of the pressure roller 1, a silicone rubber test piece was produced through the following procedure. A silicone rubber composition prepared through the same procedure as Example 1 was poured into a test piece mold having a thickness of 12 mm, and heated in a thermostatic chamber at 90° C. for 1.5 hours, to thereby produce a silicone rubber test piece (primary curing). Thereafter, the test piece removed from the mold was placed into a pressure container, the pressure container was filled with water, and the test piece was compressed at a water pressure of 20 MPa for 10 minutes. Then, the water was removed from the pressure container, and the container was returned to atmospheric pressure. Subsequently, the test piece was heated in a thermostatic chamber at 230° C. for eight hours (secondary curing).

Example 2

In Example 2, the procedure of Example 1 was repeated, except that the release layer 12 was not provided, to thereby produce a fixing roller.

Example 3

In Example 3, the procedure of Example 1 was repeated, except that purified water (50 parts by mass) was mixed, to thereby produce a silicone rubber test piece.

Example 4

In Example 4, the procedure of Example 1 was repeated, except that resin microballoons (3 parts by mass) were mixed, to thereby produce a silicone rubber test piece.

Example 5

In Example 5, the procedure of Example 1 was repeated, except that resin microballoons (1 part by mass) and purified water (10 parts by mass) were mixed, to thereby produce a silicone rubber test piece.

Example 6

In Example 6, the procedure of Example 5 was repeated, except that purified water (60 parts by mass) was mixed, to thereby produce a silicone rubber test piece.

Comparative Example 1

In Comparative Example 1, the procedure of Example 4 was repeated, except that water pressure treatment was not carried out, to thereby produce a silicone rubber test piece.

Comparative Example 2

In Comparative Example 2, the procedure of Example 4 was repeated, except that purified water was not mixed, to thereby produce a pressure roller 1 and a silicone rubber test piece.

Comparative Example 3

In Comparative Example 3, the procedure of Example 4 was repeated, except that water pressure treatment was not carried out, and purified water was not mixed, to thereby produce a silicone rubber test piece.

Comparative Example 4

In Comparative Example 4, the procedure of Example 5 was repeated, except that water pressure treatment was not carried out, to thereby produce a silicone rubber test piece.

Comparative Example 5

In Comparative Example 5, the procedure of Example 4 was repeated, except that resin microballoons (5 parts by mass) were mixed, and water pressure treatment was not carried out, to thereby produce a silicone rubber test piece.

Comparative Example 6

In Comparative Example 6, the procedure of Example 4 was repeated, except that resin microballoons (5 parts by mass) and purified water (60 parts by mass) were mixed, and water pressure treatment was not carried out, to thereby produce a silicone rubber test piece.

Test Example 1

Each of the test pieces produced in Examples 1 and 3 to 6 and Comparative Examples 1 to 6 (hereinafter the test piece may be referred to as "elastic product") was subjected to measurement in terms of compression set (C/S), Asker C hardness, and specific gravity. The presence or absence of cracking in the elastic product was visually determined.

Compression set was determined by use of the following formula 1. Specifically, each test piece was compressed by 25% at 180° C. for 22 hours and then released, and 30 minutes thereafter, the compression set of the test piece was calculated on the basis of a change in size thereof.

(The original thickness of a test piece (elastic product)−the thickness of the test piece after the test)/(the original thickness of the test piece−the thickness of a spacer)    [Formula 1]

Asker C hardness was measured by means of an Asker C hardness meter (product of Kobunshi Keiki Co., Ltd.). Specific gravity was measured by means of an electronic gravimeter (MD-200S, product of A&D). For determination of the specific gravity of each elastic product, the weight and volume of liquid silicone rubber and resin microballoons were respectively determined, and the weight of the elastic product per unit volume was calculated.

Table 1 shows the components of each of the elastic products of Examples 1 and 3 to 6 and Comparative Examples 1 to 6; the measurement results of the compression set, Asker C hardness, and specific gravity of the elastic product; and the presence or absence of cracking in the elastic product. In Table 1, the symbol "O" corresponds to no cracking in the elastic product, whereas the symbol "X" corresponds to cracking in the elastic product.

No cracking was observed in each of the elastic products of Examples 1 and 3 to 6; i.e., each of these elastic products was found to exhibit excellent processability. Each of the elastic products of Examples 1 and 3 to 6 exhibited low compression set and low hardness. Specifically, comparison between the elastic product of Example 4 and that of Comparative Example 1 shows that low compression set and low hardness are achieved through water pressure treatment. Similarly, comparison between the elastic product of Example 5 and that of Comparative Example 4 shows that low hardness is achieved through water pressure treatment. These data indicate that most of resin microballoons are broken through water pressure treatment.

Comparison between the elastic product of Example 4 and that of Comparative Example 2 shows that incorporation of purified water realizes further low compression set and hardness. Specifically, the elastic product of Example 4 exhibited a compression set about a third that of the elastic product of Comparative Example 2, and exhibited a hardness a half or less that of the elastic product of Comparative Example 2. This is attributed to the fact that the presence of purified water causes easy removal of resin microballoons from the silicone rubber product, or further promotion of breakage of the resin microballoons. Conceivably, overheated water vapor generated from purified water during secondary curing promotes carbonization of the resin microballoons, and adjacent voids communicate with one another, resulting in further reduction in compression set and hardness. As described below in Test Example 2, carbonization of resin microballoons is determined through observation under a microscope.

No large difference was observed in specific gravity between the elastic products of Examples 1, 3, 4, and 6 and the elastic products of Comparative Examples 1 to 3 and 6. However, each of the elastic products of these Examples was found to have such a low specific gravity that it can exhibit fixing performance sufficient for a pressure roller. Although the elastic product of Example 5 exhibited slightly high specific gravity, no cracking was observed therein, and the elastic product exhibited very excellent compression set (6%).

Test Example 2

Figure 7A:
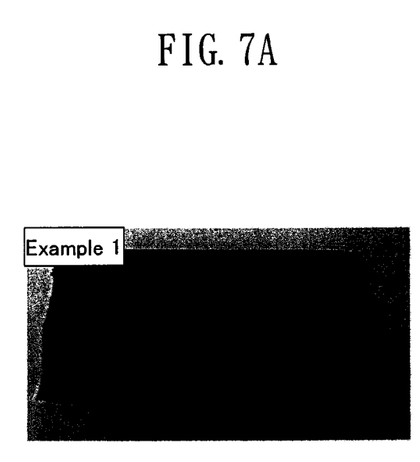
FIG. 7A is a photograph of a cross section of an elastic product of Example 1.
Figure 7B:
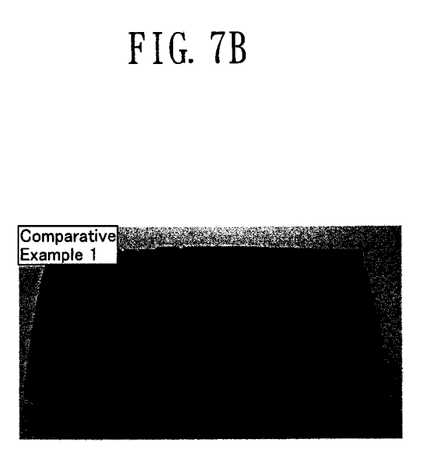
FIG. 7B is a photograph of a cross section of an elastic product of Comparative Example 1.
Figure 8A:
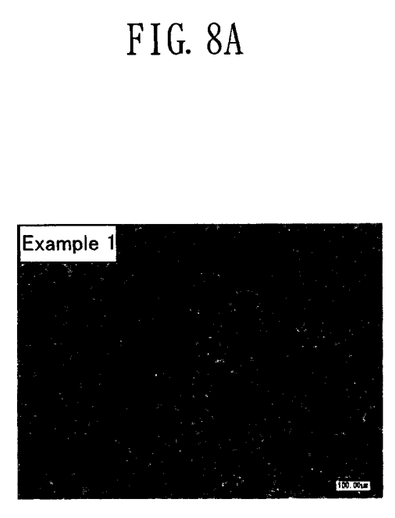
FIG. 8A is a photograph of a cross section of the elastic product of Example 1.
Figure 8B:
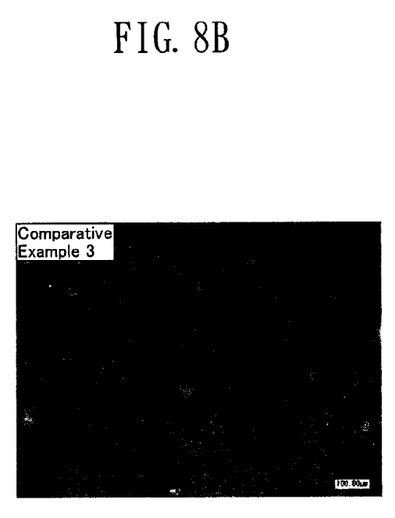
FIG. 8B is a photograph of a cross section of an elastic product of Comparative Example 3.

Cross sections of the elastic products of Example 1 and Comparative Example 1 were observed. Cross sections of the elastic products of Example 1 and Comparative Example 3 were observed under a microscope. FIGS. 7A and 7B are photographs of cross sections of the elastic products of Example 1 and Comparative Example 1, respectively. FIGS. 8A and 8B are micrographs of cross sections of the elastic products of Example 1 and Comparative Example 3, respectively.

As shown in FIG. 7A, the elastic product of Example 1 (incorporation of purified water, and water pressure treatment) was found to have a cross section of uniform color (i.e., formation of a homogenous layer). Conceivably, formation of such a homogenous layer is attributed to the fact that purified water is uniformly distributed in the silicone rubber product through water pressure treatment, resulting in even carbonation of resin microballoons and even communication of voids. In contrast, as shown in FIG. 7B, the elastic product of Comparative Example 1 (incorporation of purified water, and no water pressure treatment) was found to have a cross section of non-uniform color (i.e., no formation of a homogenous layer).

As shown in FIG. 8A, in the elastic product of Example 1, most of resin microballoons were broken. In addition, voids provided through breakage of resin microballoons were uniformly distributed in the elastic product, and these voids were found to communicate with one another by means of microvoids provided through evaporation of water.

Carbonization of resin microballoons was determined by observation of numerous black spots.

In contrast, as shown in FIG. 8B, in the elastic product of Comparative Example 3 (no incorporation of purified water, and no water pressure treatment), unbroken resin microballoons were distributed, and no communication was achieved between resin microballoons. Also, virtually no black spots were observed.

The aforementioned data indicate that when purified water is contained in the silicone rubber product, and water pressure treatment is carried out, communication between cells is achieved in the elastic product, and the elastic product exhibits low hardness and low heat capacity. In combination with the results of Test Example 1, the data also show that such communication between cells can improve compression set.

Test Example 3

Figure 9:
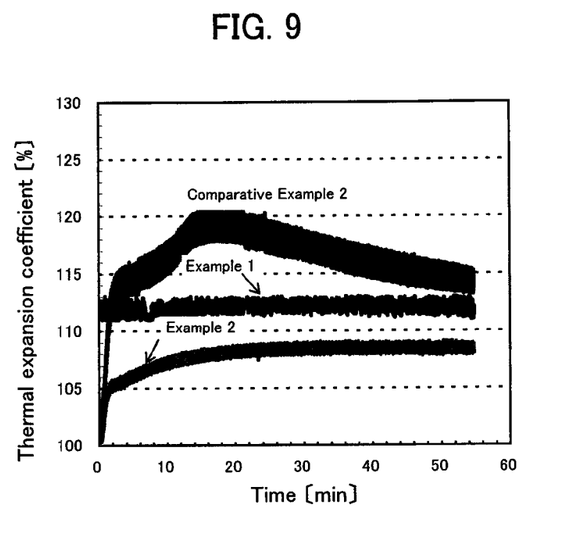
FIG. 9 is a graph showing the relationship between thermal expansion coefficient and time of pressure rollers of Example 1 and Comparative Example 2 and a fixing roller of Example 2.

Initial thermal expansion coefficient was determined for the pressure rollers of Example 1 and Comparative Example 2 and the fixing roller of Example 2. For determination of thermal expansion coefficient, each of the pressure rollers of Example 1 and Comparative Example 2 and the fixing roller of Example 2 was attached to an evaluation machine, and rotated at a linear velocity of 300 mm/sec for 55 minutes while being heated at 150° C. (compressibility: 40%). FIG. 9 shows the relationship between thermal expansion coefficient and time of the pressure rollers of Example 1 and Comparative Example 2 and the fixing roller of Example 2. As shown in FIG. 9, in each of the pressure roller of Example 1 (having a release layer) and the fixing roller of Example 2 (having no release layer), since voids provided through breakage of resin microballoons communicated with one another in the elastic layer 11, the initial thermal expansion coefficient as measured at the initiation of the test was low (less than 15% in Example 1, and less than 10% in Example 2). In contrast, in the pressure roller of Comparative Example 2 (incorporation of no purified water, and no communication between voids), the thermal expansion coefficient became as high as 20% only about 20 minutes after the initiation of the test.

The aforementioned data indicate that the initial thermal expansion coefficients of the pressure roller of Example 1 and the fixing roller of Example 2 (incorporation of purified water, and communication between voids) can be reduced to less than 15% and less than 10%, respectively, and that a change in roller outer diameter caused by heating can be suppressed.

Test Example 4

Figure 10:
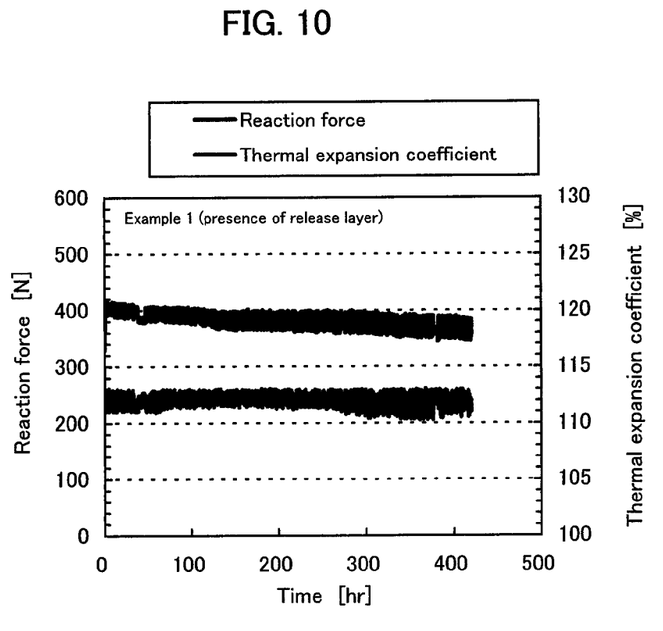
FIG. 10 is a graph showing the relationship between reaction force, thermal expansion coefficient, and time of the pressure roller of Example 1.
Figure 11:
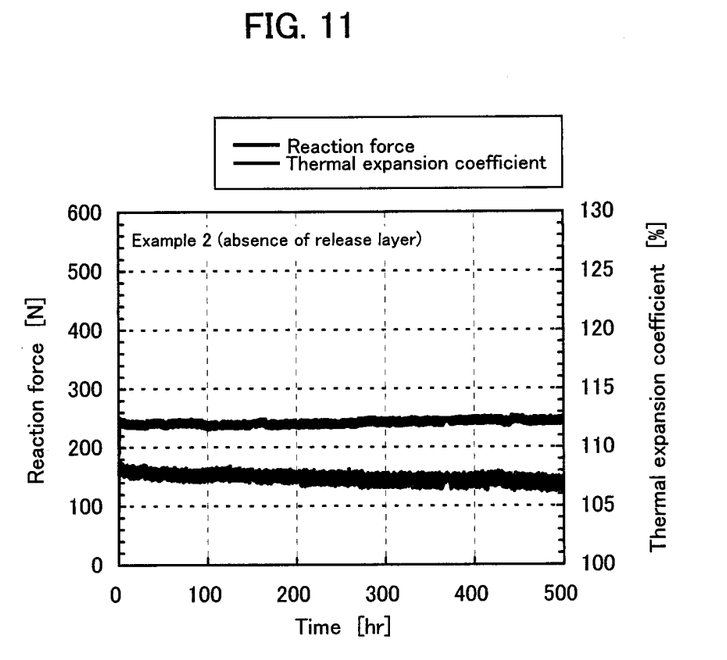
FIG. 11 is a graph showing the relationship between reaction force, thermal expansion coefficient, and time of the fixing roller of Example 2.

Reaction force and thermal expansion coefficient were determined for the pressure roller of Example 1 and the fixing roller of Example 2. For determination of reaction force and thermal expansion coefficient, the procedure of Test Example 3 was repeated, except that the measurement time was changed to 420 hours (for the pressure roller of Example 1) or 500 hours (for the fixing roller of Example 2). FIG. 10 shows the relationship between reaction force, thermal expansion coefficient, and time of the pressure roller of Example 1, and FIG. 11 shows the relationship between reaction force, thermal expansion coefficient, and time of the fixing roller of Example 2.

In the pressure roller of Example 1 having a release layer, a change in reaction force was suppressed even after the elapse of 420 hours. The thermal expansion coefficient was less than 15% at the initiation of the test, and remained at the same level even after the elapse of 420 hours. These data indicate that a change in roller outer diameter caused by heating can be suppressed over a long period of time.

The reaction force and thermal expansion coefficient of the fixing roller of Example 2 having no release layer were superior to those of the pressure roller of Example 1. Specifically, in the fixing roller of Example 2, a change in reaction force was suppressed even after the elapse of 500 hours. Also, the thermal expansion coefficient was only less than 10% at the initiation of the test, and remained at the same level even after the elapse of 500 hours.

These data indicate that, in the case of the aforementioned pressure roller or fixing roller (incorporation of purified water, and communication between voids), reaction force is not reduced even after the elapse of a long period of time, and no change in outer diameter is observed; i.e., the roller is formed of an excellent material having high durability.

TABLE 1

| | Components of silicone rubber compostion (parts by mass) | | | Water pressure treatment | Compression set (%) | Asker C hardness | Specific gravity | Cracking of elastic product |
|---|---|---|---|---|---|---|---|---|
| | Liquid silicone rubber | Resin micro-balloons | Purified water | | | | | |
| Ex. 1 | 100 | 2 | 30 | Done | 17.9 | 23 | 0.565 | ○ |
| Ex. 3 | 100 | 2 | 50 | Done | 31.5 | 22 | 0.541 | ○ |
| Ex. 4 | 100 | 3 | 30 | Done | 30 | 22 | 0.502 | ○ |
| Ex. 5 | 100 | 1 | 10 | Done | 6 | 34 | 0.714 | ○ |
| Ex. 6 | 100 | 1 | 60 | Done | 11 | 24 | 0.573 | ○ |
| Comp. Ex. 1 | 100 | 3 | 30 | Not done | 38 | 35 | 0.461 | ○ |
| Comp. Ex. 2 | 100 | 3 | — | Done | 97 | 48 | 0.484 | ○ |
| Comp. Ex. 3 | 100 | 3 | — | Not done | 96 | 49 | 0.476 | ○ |
| Comp. Ex. 4 | 100 | 1 | 10 | Not done | — | 40 | 0.68 | X |
| Comp. Ex. 5 | 100 | 5 | 30 | Not done | — | — | — | X |
| Comp. Ex. 6 | 100 | 5 | 60 | Not done | — | 23 | 0.473 | X |

What is claimed is:

1. A method for producing a fixing pressure roller for being employed in a fixing unit of a fixing device, the fixing pressure roller comprising a core, and an elastic layer provided around the core, wherein the method comprises steps of:
   mixing a silicone rubber raw material with resin microballoons and water to thereby prepare a silicone rubber composition;
   charging the silicone rubber composition around the core placed in a mold;
   curing the silicone rubber composition to form a silicone rubber product containing the resin microballoons and water; and
   applying pressure to the silicone rubber product to break the resin microballoons contained therein to provide voids where the resin microballoons had been located, and to overheat the water to form water vapor that promotes carbonization of the broken resin microballoons, wherein adjacent said voids communicate with one another, so that the silicone rubber product includes therein voids to form the elastic layer provided around the core.

2. The method according to claim 1, wherein the pressure is water pressure.

3. The method according to claim 2, further comprising applying a release layer on the elastic layer.

4. The method according to claim 1, further comprising applying a release layer on the elastic layer.

* * * * *